(12) United States Patent
Kumagai et al.

(10) Patent No.: US 10,621,070 B2
(45) Date of Patent: Apr. 14, 2020

(54) INFORMATION PROCESSING SYSTEM AND UPDATING METHOD

(71) Applicants: Masateru Kumagai, Kanagawa (JP); Tadashi Honda, Kanagawa (JP); Kohichiroh Nishikawa, Tokyo (JP); Tomoya Amikura, Tokyo (JP)

(72) Inventors: Masateru Kumagai, Kanagawa (JP); Tadashi Honda, Kanagawa (JP); Kohichiroh Nishikawa, Tokyo (JP); Tomoya Amikura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 77 days.

(21) Appl. No.: 15/786,716

(22) Filed: Oct. 18, 2017

(65) Prior Publication Data
US 2018/0113792 A1 Apr. 26, 2018

(30) Foreign Application Priority Data
Oct. 25, 2016 (JP) .................. 2016-208945

(51) Int. Cl.
*G06F 9/44* (2018.01)
*G06F 11/36* (2006.01)
(Continued)

(52) U.S. Cl.
CPC ........ *G06F 11/3664* (2013.01); *G06F 3/0604* (2013.01); *G06F 8/65* (2013.01);
(Continued)

(58) Field of Classification Search
CPC ...... G06F 9/52; G06F 11/261; G06F 11/3692; G06F 9/5061; G06F 11/2242;
(Continued)

(56) References Cited

U.S. PATENT DOCUMENTS

| 7,509,533 B1 * | 3/2009 | Govindarajalu .... G06F 11/2242 714/30 |
| 8,990,778 B1 * | 3/2015 | Allocca ............... G06F 11/3692 717/126 |

(Continued)

FOREIGN PATENT DOCUMENTS

JP 2014-153804 8/2014

*Primary Examiner* — Tuan A Vu
(74) *Attorney, Agent, or Firm* — Harness, Dickey & Pierce, P.L.C.

(57) ABSTRACT

An information processing system includes a first memory that stores information on a request for performing data processing associated with a type of the data processing, a second memory that stores information on a request for performing data processing for testing, and a plurality of circuitry that performs data processing according to the type of the data processing. The plurality of circuitry includes a first circuitry that operates in a normal mode and a second circuitry that operates in a test mode. The second circuitry starts up in the test mode to operate in the test mode if the first circuitry operates in the normal mode and transitions from the test mode to the normal mode according to a user request. In the normal mode, the circuitry acquires the information on the request for performing the data processing from the first memory and performs the data processing.

5 Claims, 10 Drawing Sheets

(51) Int. Cl.
   *G06F 3/06* (2006.01)
   *G06F 11/22* (2006.01)
   *G06F 8/65* (2018.01)
   *G06F 9/50* (2006.01)

(52) U.S. Cl.
   CPC ........ *G06F 9/5005* (2013.01); *G06F 11/2236* (2013.01); *G06F 11/2273* (2013.01)

(58) Field of Classification Search
   CPC .... G06F 11/1487; G06F 21/6227; G06F 1/24; G06F 11/3664; G06Q 10/1053
   See application file for complete search history.

(56) References Cited

U.S. PATENT DOCUMENTS

| | | | |
|---|---|---|---|
| 2006/0155729 A1* | 7/2006 | Aahlad | G06F 9/52 |
| 2009/0172529 A1* | 7/2009 | Jas | G06F 11/261 |
| | | | 715/700 |
| 2011/0066779 A1* | 3/2011 | Bogenberger | G06F 11/1487 |
| | | | 710/107 |
| 2012/0101929 A1* | 4/2012 | Howard | G06Q 10/1053 |
| | | | 705/35 |
| 2013/0198211 A1 | 8/2013 | Kohkaki et al. | |
| 2013/0342246 A1* | 12/2013 | Paaske | G06F 1/24 |
| | | | 327/143 |
| 2014/0173060 A1* | 6/2014 | Jubran | G06F 9/5061 |
| | | | 709/220 |
| 2014/0201759 A1 | 7/2014 | Amikura | |
| 2014/0223004 A1 | 8/2014 | Honda et al. | |
| 2014/0223150 A1 | 8/2014 | Honda et al. | |
| 2014/0304505 A1* | 10/2014 | Dawson | G06F 21/6227 |
| | | | 713/165 |
| 2015/0156340 A1 | 6/2015 | Yamano et al. | |

\* cited by examiner

FIG. 5

| ORGANIZATION ID | ORGANIZATION NAME | COUNTRY | LANGUAGE | ADDRESS INFORMATION | ... |
|---|---|---|---|---|---|
| XXX | CORPORATION A | JAPAN | JAPANESE | CompanyA@print.com | |
| YYY | CORPORATION B | USA | ENGLISH | CompanyB@print.com | |

FIG. 6

| ORGANIZATION ID | USER NAME | PASSWORD | ADDRESS INFORMATION | ... |
|---|---|---|---|---|
| XXX | User A | AAA | A@aaa.com | |
| XXX | User B | BBB | B@aaa.com | |
| XXX | User C | CCC | C@aaa.com | |
| YYY | User A | AAA | A@bbb.com | |
| YYY | User D | DDD | D@bbb.com | |

FIG. 7

| ORGANIZATION ID | DEVICE AUTHENTICATION INFORMATION | BUSINESS PLACE INFORMATION | CAPABILITY | ... |
|---|---|---|---|---|
| XXX | 111 | BUSINESS PLACE A | A4 COLOR MFP | |
| XXX | 222 | BUSINESS PLACE B | A2 COLOR MFP | |
| XXX | 333 | BUSINESS PLACE B | A4 MONOCHROME MFP | |
| YYY | 444 | - | A4 COLOR MFP | |

FIG. 8
RELATED ART
(A) STOP AND UPDATE SERVICE
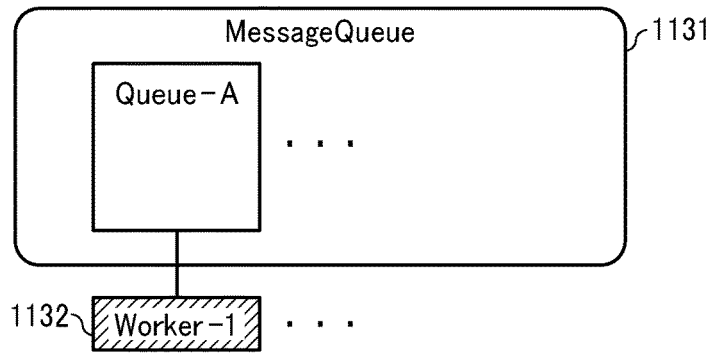
(B) START DUMMY WORKER
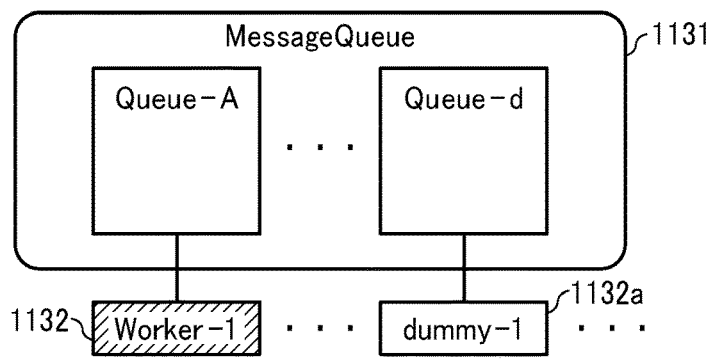
(C) CHECK
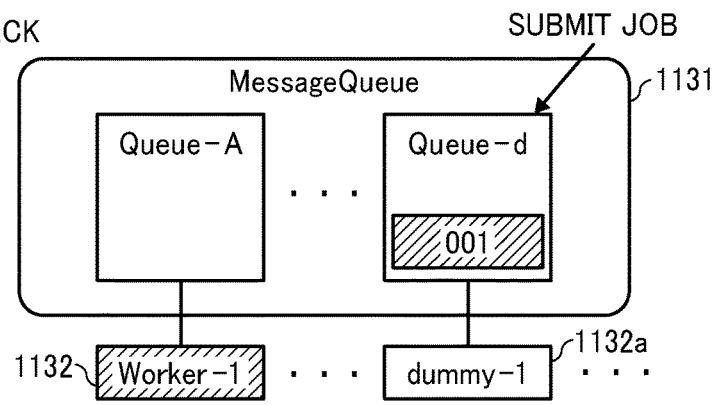
(D) STOP DUMMY WORKER AND START SERVICE

FIG. 9
(A) ALLOCATE WORKER IN TEST MODE
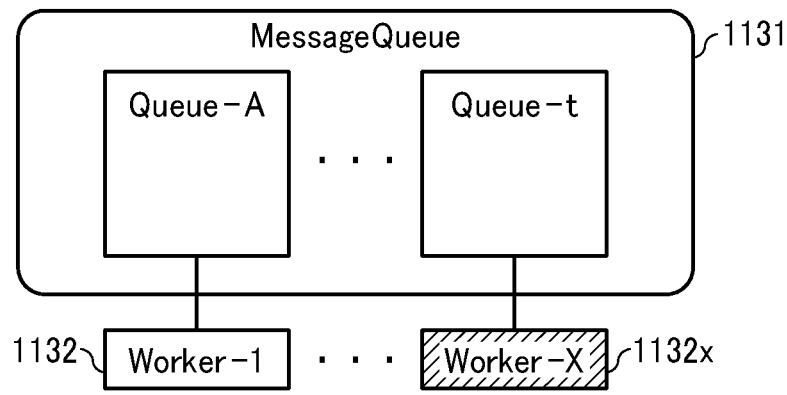
(B) CHECK
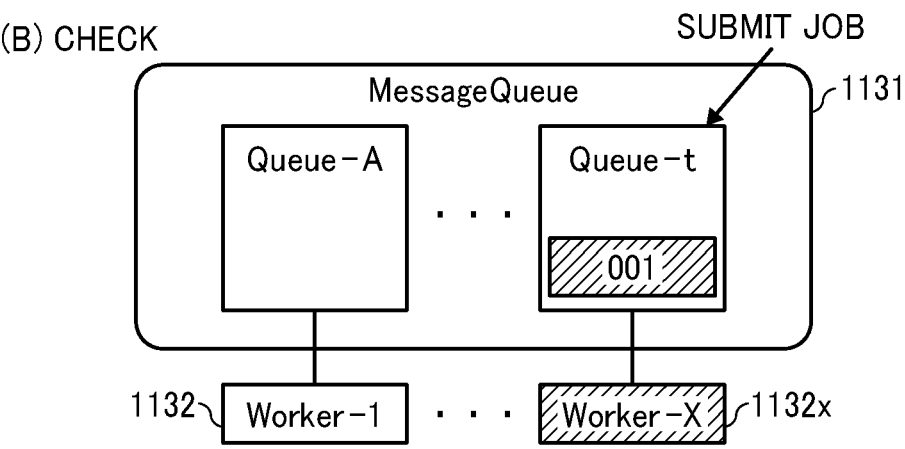
(C) TRANSITION TO NORMAL MODE
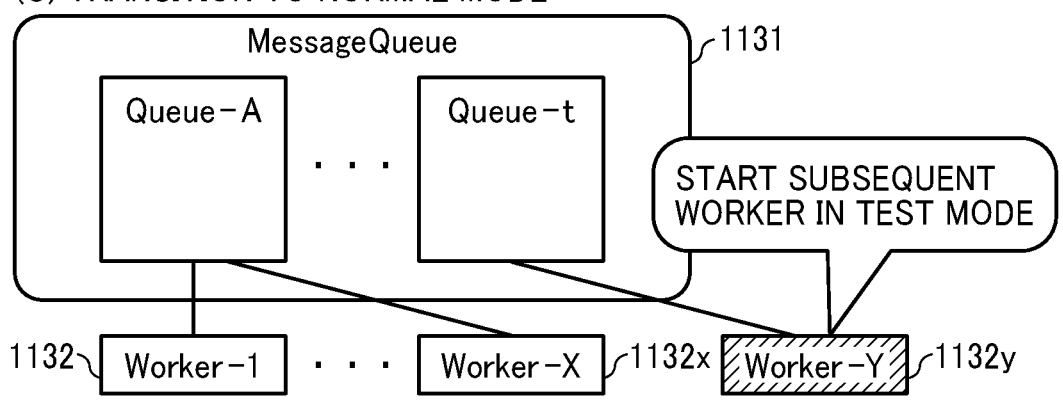

INFORMATION PROCESSING SYSTEM AND UPDATING METHOD

CROSS-REFERENCE TO RELATED APPLICATION

This patent application is based on and claims priority pursuant to 35 U.S.C. § 119(a) to Japanese Patent Application No. 2016-208945, filed on Oct. 25, 2016 in the Japan Patent Office, the entire disclosure of which is hereby incorporated by reference herein.

BACKGROUND

Technical Field

The present invention relates to an information processing system and an updating method.

Background Art

In order to enhance independence of programs and ease of maintenance of programs, for example, servers that perform data conversion utilize a data conversion engine (such as data conversion programs and data conversion libraries etc.) to perform data conversion in some cases.

If multiple types of data conversion and multiple types of data processing are to be performed, a large number of data conversion engines and data processing engines are required. In information processing systems that utilize the data conversion engines and data processing engines described above, a technology that updates the data conversion engines and data processing engines is known.

SUMMARY

Example embodiments of the present invention provide a novel information processing system that includes a first memory that stores information on a request for performing data processing associated with a type of the data processing, a second memory that stores information on a request for performing data processing for testing, and a plurality of circuitry that performs data processing according to the type of the data processing. The plurality of circuitry includes a first circuitry that operates in a normal mode and a second circuitry that operates in a test mode. The second circuitry starts up in the test mode to operate in the test mode if the first circuitry operates in the normal mode and transitions from the test mode to the normal mode according to a user request to operate in the normal mode. The normal mode is a mode in which the circuitry acquires the information on the request for performing the data processing being stored in the first memory and performs the data processing, and the test mode is a mode in which the circuitry acquires the information on the request for performing the data processing for testing being stored in the second memory and performs the data processing for testing.

Further example embodiments of the present invention provide a method of updating.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 5 is a diagram illustrating organization information according to an embodiment of the present invention;

FIG. 6 is a diagram illustrating user information according to an embodiment of the present invention;

FIG. 7 is a diagram illustrating apparatus information according to an embodiment of the present invention;

FIG. 8 is a diagram illustrating a conventional operation of releasing a worker;

FIG. 9 is a diagram illustrating an operation of releasing a worker according to an embodiment of the present invention;

Figure 1:
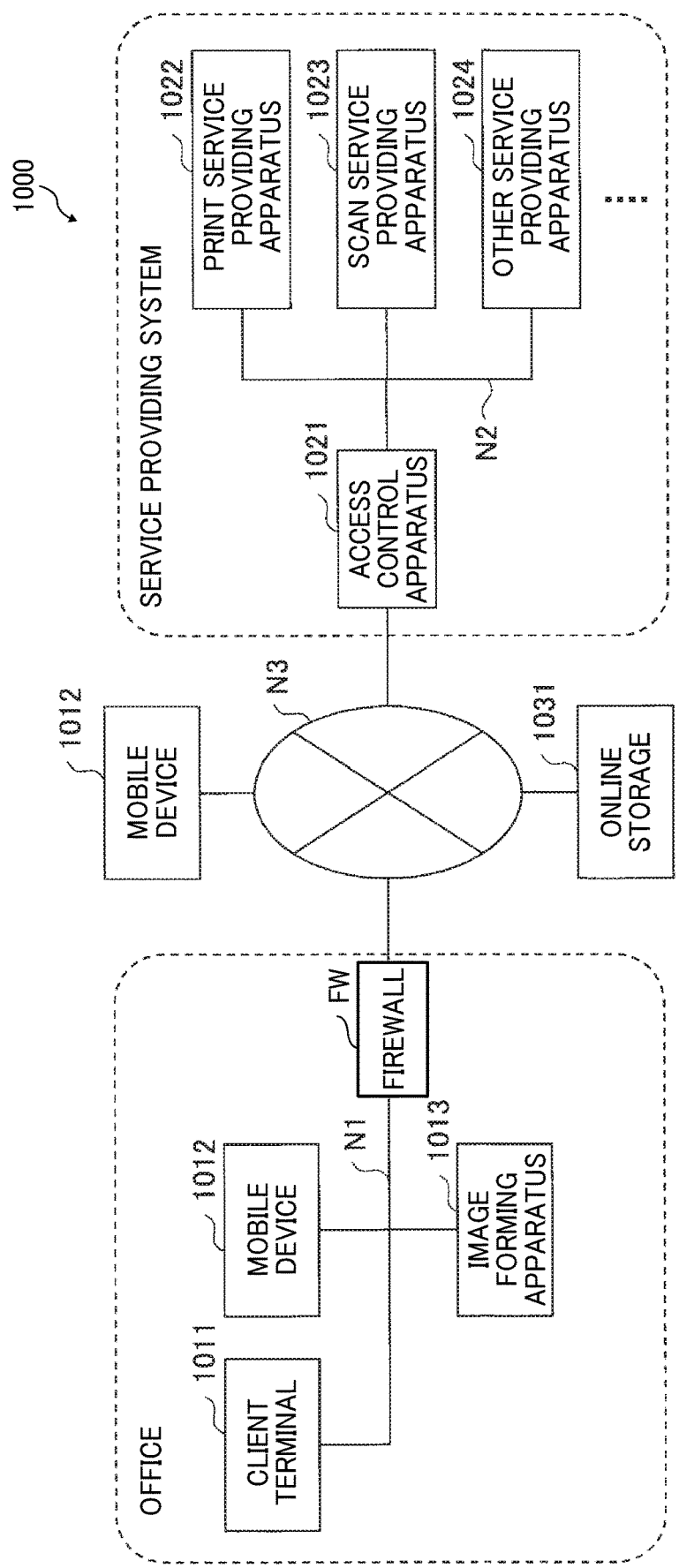
FIG. 1 is a diagram illustrating a configuration of an information processing system according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Exemplary embodiments of this disclosure are now described below with reference to the accompanying drawings.

First Embodiment

FIG. 1 is a diagram illustrating a configuration of an information processing system in this embodiment. For example, an information processing system 1000 in FIG. 1 includes a network N1 such as intranet located within a corporation, a network N2 of a service providing system such as a cloud service etc., and a network N3 such as the Internet etc.

The network N1 is a private network located inside a firewall FW. The firewall FW is located at a junction of the network N1 and network N3 to detect and shut out illegal accesses. A client terminal 1011, a mobile device 1012, and an image forming apparatus 1013 such as a multifunction peripheral (MFP) etc. are connected to the network N1.

The client terminal 1011 is an example of a terminal apparatus. The client terminal 1011 may be implemented by using an information processing apparatus that software such as a generic operating system (OS) etc. is installed. The client terminal 1011 includes a wireless communication method or a wired communication method. The client terminal 1011 is a terminal that may be used by user operation such as a tablet personal computer (PC) and a laptop PC etc.

The mobile device 1012 is an example of a terminal apparatus. The mobile device 1012 includes a wireless communication method or a wired communication method. The mobile device 1012 is a terminal that may be taken along by a user such as a smartphone, a cellphone, a tablet PC, and a laptop PC etc.

The image forming apparatus 1013 is an apparatus capable of forming an image such as the MFP etc. The image forming apparatus 1013 includes a wireless communication method or a wired communication method. The image forming apparatus 1013 is an apparatus that performs image forming operations such as the MFP, a copier, a scanner, a printer, a laser printer, a projector and a whiteboard etc. For example, one client terminal 1011, one mobile device 1012, and one image forming apparatus 1013 are illustrated respectively in FIG. 1. However, it is possible to include multiple client terminals 1011, multiple mobile devices 1012, or multiple image forming apparatuses 1013.

The network N2 is connected to the network N3 via an access control apparatus 1021. The access control apparatus 1021 ensures security of the network N2. A print service providing apparatus 1022, a scan service providing apparatus 1023, and an other service providing apparatus 1024 are connected to the network N2.

In the information processing system 1000 in FIG. 1, the access control apparatus 1021, the print service providing apparatus 1022, the scan service providing apparatus 1023, and the other service providing apparatus 1024 implement the service providing system. The print service providing apparatus 1022, the scan service providing apparatus 1023, and the other service providing apparatus 1024 provide a print service, a scan service, and other services.

The access control apparatus 1021 controls logging into the print service provided by the print service providing apparatus 1022 and the scan service provided by the scan service providing apparatus 1023 etc.

The access control apparatus 1021, the print service providing apparatus 1022, the scan service providing apparatus 1023, and the other service providing apparatus 1024 may be implemented by using more than one information processing apparatus.

The access control apparatus 1021, the print service providing apparatus 1022, the scan service providing apparatus 1023, and the other service providing apparatus 1024 may be implemented by being integrated into one information processing apparatus. Otherwise, the access control apparatus 1021, the print service providing apparatus 1022, the scan service providing apparatus 1023, and the other service providing apparatus 1024 may be implemented by being distributed into multiple information processing apparatuses.

A part of the service on the side of the network N2 may be implemented outside the network N2. The mobile device 1012 may be located outside the network N1 such as intranet etc. In the information processing system 1000 in FIG. 1, the mobile devices 1012 are located in the network N1 and network N3.

An online storage 1031 connected to the network N3 is an apparatus that stores files. The online storage 1031 may be an apparatus for storing files provided by a vendor.

Figure 2:
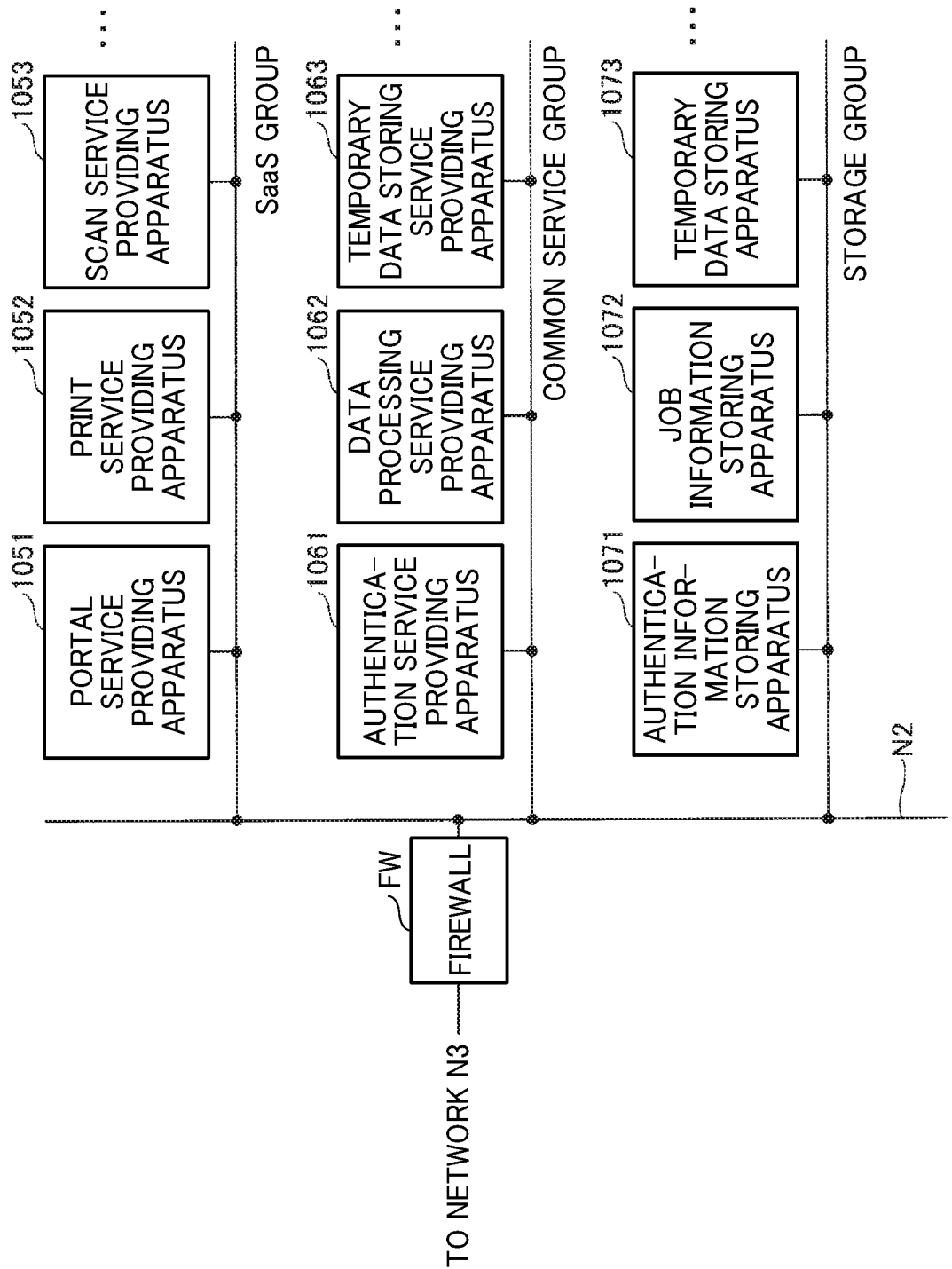
FIG. 2 is a diagram illustrating a configuration of a service providing system according to an embodiment of the present invention.

The configuration of the service providing system illustrated in FIG. 1 is just an example, and the service providing system may be implemented by using a configuration illustrated in FIG. 2. FIG. 2 is a diagram illustrating a configuration of a service providing system in this embodiment. In the service providing system in FIG. 2, the network N2 is connected to the network N3 via the firewall FW.

A service providing apparatus whose type is Software as a Service (SaaS), a service providing apparatus whose type is common service (Network Service Platform), and a storage device whose type is Storage are connected to the network N2. It should be noted that the service providing apparatus whose type is common service provides service that the service providing apparatus whose type is SaaS may use in common.

Service providing apparatuses corresponding to service to be provided such as a portal service providing apparatus 1051, a print service providing apparatus 1052, and a scan service providing apparatus 1053 etc. are included in the service providing apparatus whose type is SaaS. Service providing apparatuses corresponding to common service to be provided such as an authentication service providing apparatus 1061, a data processing service providing apparatus 1062, and a temporary data storing service providing apparatus 1063 etc. are included in the service providing apparatus whose type is common service. For example, storage devices corresponding to information (data) to be stored such as an authentication information storage device 1071, a job information storage device 1072, and a temporary data storage device 1073 etc. are included in the storage device whose type is storage.

In the service providing system illustrated in FIG. 2, for example, authentication service provided by firewall FW and the authentication service providing apparatus 1061 ensures security. It should be noted that the configuration of the service providing system in FIG. 2 is just an example and other configurations may be adopted.

Figure 3:
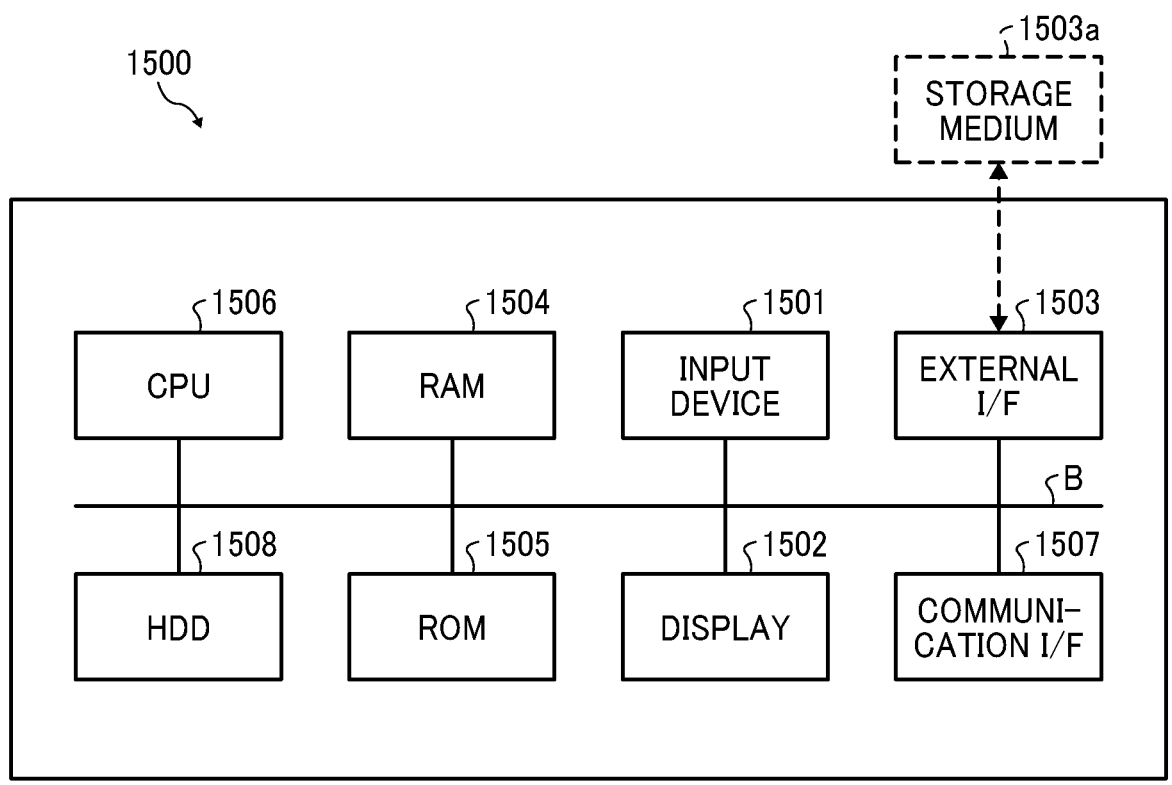
FIG. 3 is a diagram illustrating a hardware configuration of a computer system according to an embodiment of the present invention.

For example, the client terminal 1011, the mobile device 1012, the access control apparatus 1021, the print service providing apparatus 1022, the scan service providing apparatus 1023, and the other service providing apparatus 1024 may be implemented by using a computer system whose hardware configuration is illustrated in FIG. 3. The service providing apparatus whose type is SaaS, the service providing apparatus whose type is common service, and the storage device whose type is storage illustrated in FIG. 2 may also be implemented by using the computer system whose hardware configuration is illustrated in FIG. 3 for example, FIG. 3 is a diagram illustrating a hardware configuration of a computer system in this embodiment. A computer system 1500 in FIG. 3 includes a input device 1501, a display 1502, an external I/F 1503, a random access memory (RAM) 1504, a read only memory (ROM) 1505, a central processing unit (CPU) 1506, a communication I/F 1507, and a HDD 1508 etc., and those components are connected with each other via a bus B.

The input device 1501 includes a keyboard, a mouse, and a touch panel etc., and various operating signals are input into the input device 1501 by user operation. The display 1502 includes a display etc., and the display 1502 displays a processing result by the computer system 1500.

The communication I/F 1507 is an interface that connects the computer system 1500 to the networks N1, N2, and N3. As a result, the computer system 1500 can perform data communication via the communication I/F 1507.

The HDD 1508 is a nonvolatile storage device that stores programs and data. The programs and data stored in the HDD 1508 include an OS that controls the whole computer system 1500 and application software that provides various functions on the OS etc.

The HDD 1508 manages the stored programs and data using a predetermined file system and/or a database (DB). The external I/F 1503 is an interface with an external apparatus. A storage medium 1503a is an example of the external apparatus. As a result, the computer system 1500 can read/write data from/to the storage medium 1503a via the external I/F 1503. Examples of the storage medium 1503a are a flexible disk, a Compact Disc (CD), a Digital Versatile Disk (DVD), a SD memory card, and a Universal Serial Bus (USB) memory etc.

The ROM 1505 is a nonvolatile semiconductor memory (a storage device) that can keep programs and data after cutting power off. The ROM 1505 stores a Basic Input/Output System (BIOS) executed during a boot-up sequence of the computer system 1500, an OS configuration, and programs and data such as network settings etc. The RAM 1504 is a volatile semiconductor memory (a storage device) that stores programs and data temporarily.

The CPU 1506 controls the whole computer system 1500 and implements functions of the computer system 1500 by reading programs and data from the storage devices such as the ROM 1505 and the HDD 1508 etc., expanding them into the RAM 1504, and executing processes.

In the client terminal 1011, the mobile device 1012, the access control apparatus 1021, the print service providing apparatus 1022, the scan service providing apparatus 1023, and the other service providing apparatus 1024, by adopting the hardware configuration of the computer system 1500, various operation (described later) may be implemented. In addition, in the service providing apparatus whose type is SaaS, the service providing apparatus whose type is common service, and the storage device whose type is storage illustrated in FIG. 2, various operations (described later) may be implemented by adopting the hardware configuration of the computer system 1500. It should be noted that descriptions for hardware configurations of the image forming apparatus 1013 and the firewall FW illustrated in FIG. 1 are omitted.

Figure 4:
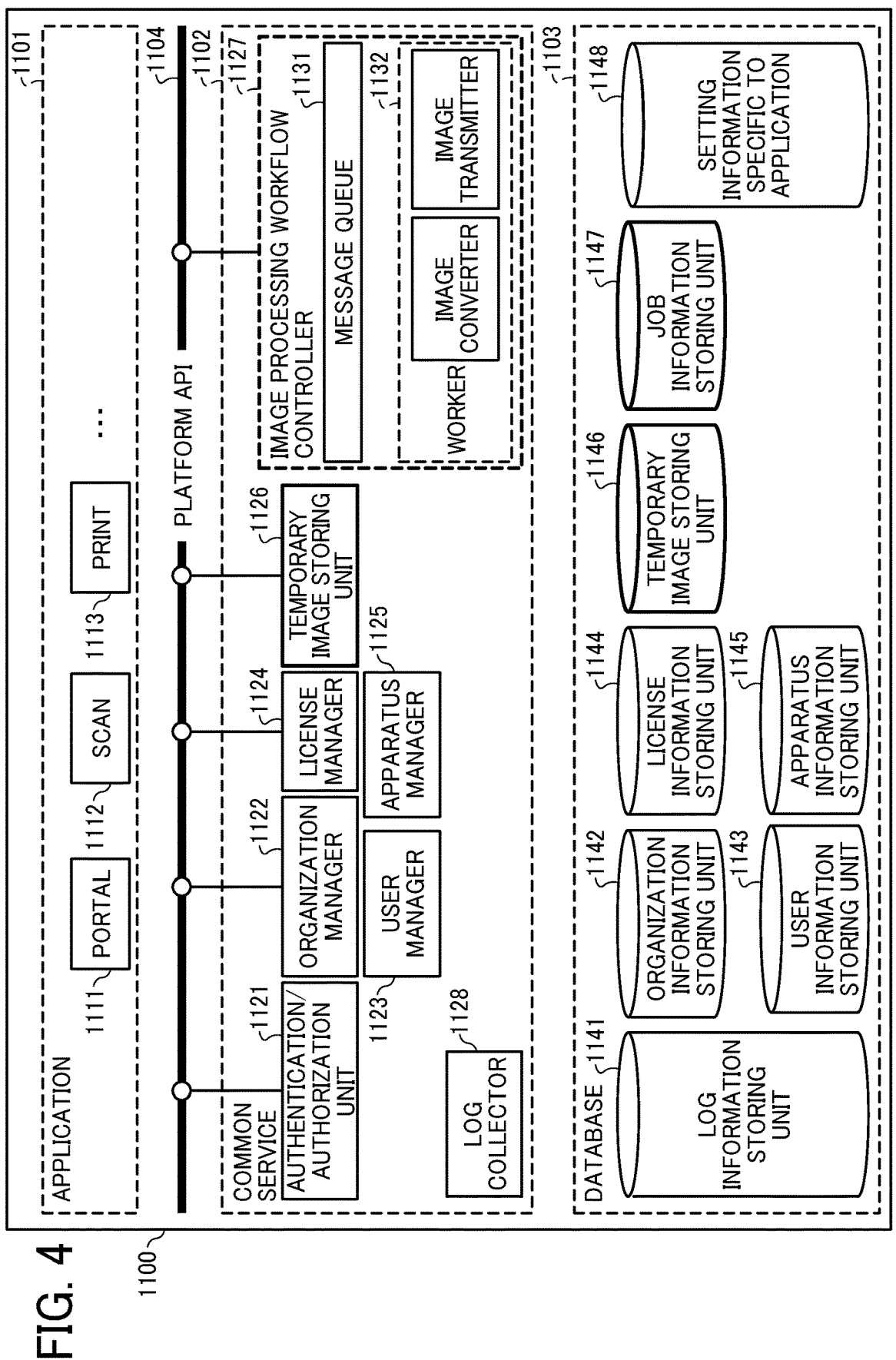
FIG. 4 is a block diagram illustrating an operation performed by the service providing system according to an embodiment of the present invention.

For example, the service providing system in this embodiment may be implemented by using functional blocks illustrated in FIG. 4. FIG. 4 is a block diagram illustrating an operation performed by the service providing system in this embodiment.

By executing programs, the service providing system 1100 implements an application 1101, a common service 1102, a DB 1103, and a platform Application Programming Interface (API) 1104.

For example, the application 1101 includes a portal service application 1111, a scan service application 1112, and a print service application 1113.

The portal service application 1111 is an application that provides portal service. The portal service provides service as an entrance for using the service providing system 1100. The scan service application 1112 is an application that provides scan service. The print service application 1113 is an application that provides print service. The application 1101 may include other service application.

The platform API 1104 is an interface for using the common service 1102 by the application 1101 such as the portal service application 1111, the scan service application 1112, the print service application 1113 etc. The platform API 1104 is a predetermined interface for receiving a request from the application 1101 by the common service 1102 and constructed by functions and classes etc.

If the service providing system 1100 is constructed by multiple information processing apparatuses, the platform API 1104 may be implemented by a web API that may be used via a network etc. for example.

The common service 1102 includes an authentication/authorization unit 1121, an organization manager 1122, a user manager 1123, a license manager 1124, an apparatus manager 1125, a temporary image storing unit 1126, an image processing workflow controller 1127, and a log collector 1128.

In addition, the image processing workflow controller 1127 includes a message queue 1131 and one or more workers 1132. The worker 1132 implements functions such as image conversion and image transmission etc.

The authentication/authorization unit 1121 authenticates and authorizes a user based on a request for login from office apparatuses such as the client terminal 1011 and the image forming apparatus 1013. Here, the office apparatus is a generic name for the client terminal 1011, the mobile device 1012, and the image forming apparatus 1013 etc.

For example, the authentication/authorization unit 1121 authenticates and authorizes a user by accessing a user information storing unit 1143 and a license information storing unit 1144 etc. (described later). In addition, for example, the authentication/authorization unit 1121 authenticates the image forming apparatus 1013 by accessing an organization information storing unit 1142, a license information storing unit 1144, and an apparatus information storing unit 1145 etc. (described later).

The organization manager 1122 manages organization information stored in the organization information storing unit 1142 (described later). The user manager 1123 manages user information stored in the user information storing unit 1143 (described later).

The license manager 1124 manages license information stored in the license information storing unit 1144 (described later). The apparatus manager 1125 manages apparatus information stored in the apparatus information storing unit 1145 (described later). The temporary image storing unit 1126 stores a temporary image in a temporary image storing unit 1146 (described later) and acquires a temporary image from the temporary image storing unit 1146 (described later).

The image processing workflow controller 1127 controls workflow regarding the image processing based on a request from the application 1101. The message queue 1131 includes a queue corresponding to a type of processing. Here, the message queue 1131 also includes a queue dedicated to testing (described later). The image processing workflow controller 1127 puts a message of a request regarding a processing (a job) in a queue corresponding to the type of the job.

The worker 1132 monitors the corresponding queue. In addition, the worker includes a normal mode and a test mode (described later). After putting the message in the queue, the worker 1132 running in the normal mode performs an operation such as the image conversion and image transmission in accordance with the type of the corresponding job. After putting the message in the queue dedicated to testing, the worker 1132 running in the test mode performs an operation in accordance with the message.

Here, the worker 1132 may read the message put into the queue proactively (pull), or the queue may provide the message to the worker 1132 (push). The operation performed by the image processing workflow controller 1127 is described later.

The DB 1103 includes the log information storing unit 1141, the organization information storing unit 1142, the user information storing unit 1143, the license information storing unit 1144, the apparatus information storing unit 1145, the temporary image storing unit 1146, the job information storing unit 1147, and a setting information specific to application storing unit 1148.

The log information storing unit 1141 stores log information. The organization information storing unit 1142 stores organization information (described later). The user information storing unit 1143 stores user information (described later). The license information storing unit 1144 stores license information. The apparatus information storing unit 1145 stores apparatus information (described later).

The temporary image storing unit 1146 stores a temporary image. For example, the temporary image is a file and data such as a scanned image that the worker 1132 processes. The job information storing unit 1147 stores information on a request (job information) regarding the operation (job). The setting information specific to application storing unit 1148 stores setting information specific to the application 1101.

The service providing system 1100 functions as an integrated platform that provides common service such as workflow regarding authentication/authorization and image processing and a group of service that proves application service such as scan service and print service etc. using functions of the integrated platform. For example, the integrated platform is constructed by the common service 1102, the DB 1103, and the platform API 1104. For example, the group of service is constructed by the application 1101.

It should be noted that the categorized format of processing blocks in the service providing system 1100 illustrated in FIG. 4 is just an example, and it is not required that the application 1101, the common service 1102, and the DB 1103 are categorized in the hierarchy illustrated in FIG. 4. If the processing of the service providing system 1100 in this embodiment may be implemented, the hierarchy relationship illustrated in FIG. 4 is not limited to the specific one.

FIG. 5 is a diagram illustrating organization information in this embodiment. The organization information includes an organization ID, organization name, country, language, and address information etc. as data items. The organization ID is information specifying a group such as a corporation and division etc. The organization ID is not limited to language as the organization and may be information specifying a contract for example. It should be noted that the organization ID is unique.

The organization name is a name of a group such as a corporation and division etc. The country indicates a name of a country that the corporation and division etc. belong. The country indicates a name of a country that the corporation and division etc. belong. The address information indicates a mail address of a group such as the corporation and division etc.

FIG. 6 is a diagram illustrating user information in this embodiment. The user information illustrated in FIG. 6 includes the organization ID, user name, password, and address information etc. as data items. The user name and password is information that specifies a user. Therefore, the user name may be a user ID etc. In addition, the password is not mandatory. In addition, the user name and password managed using the same organization ID are unique. However, it is possible that the user name and password are redundant if the organization ID is different. For example, the address information indicates a mail address of a user.

Furthermore, it is possible to use information for identifying an electronic medium (such as an IC card etc.) that the user holds as the user name. Examples of the electronic medium that the user holds are the IC card, cellphone, tablet device, and an electronic book reader etc. Examples of information for identifying the electronic medium are a telephone number of the cellphone and profile information of the terminal etc. The information for identifying the electronic medium may be combined.

FIG. 7 is a diagram illustrating apparatus information in this embodiment. The apparatus information in FIG. 7 includes an organization ID, device authentication information, business place information, and capability etc. as data items. The device authentication information is information for authenticating a device to determine that the office apparatus is suitable for a specific condition. The device authentication information may be an ID indicating that a specific application is installed in the office apparatus and an apparatus number indicating a specific office apparatus etc. The business place information indicates a business place where the office apparatus is located for example. The capability indicates capability of the office apparatus for example.

FIG. 8 is a diagram illustrating a conventional operation of releasing a worker. For example, the worker 1132 operates in a worker server. For example, the worker server receives a command from a developer and performs an operation regarding the worker 1132.

In FIG. 8A, for example, the developer stops service of the worker 1132 to be released so that a new job is not input anymore. Subsequently, after finishing the job, the developer commands to update the worker 1132 to be updated. The worker server updates the worker 1132 to be updated by updating a program of the worker 1132.

In FIG. 8B, the developer executes the updated worker 1132 as a dummy worker 1132*a* running in the test mode. It should be noted that the dummy worker 1132*a* running in the test mode is referred to as a dummy worker. In addition, the developer starts a queue for testing (referred to as a dummy queue hereinafter). The dummy worker 1132*a* in the test mode is connected to the dummy queue.

In FIG. 8C, the developer puts a job in the dummy queue and checks whether or not the dummy worker 1132*a* operates normally by requesting the dummy worker 1132*a* to process the job.

In FIG. 8D, after receiving a result of processing the job by the dummy worker 1132a, the developer stops the dummy queue and the dummy worker 1132a, if there is no problem. The developer starts the updated worker 1132 in normal mode and resumes service provided by the worker 1132. It should be noted that the worker 1132 in normal mode accepts a message from a queue for a user (hereinafter referred to as a normal queue).

FIG. 9 is a diagram illustrating an operation of releasing a worker in this embodiment. For example, the workers 1132, 1132x, and 1132y operate in a worker server. It should be noted that, in FIGS. 9A to 9C, the worker 1132 continues operation in normal mode. In FIG. 9A, the developer allocates a worker 1132x to be released and starts the worker 1132x in test mode.

It should be noted that the worker 1132x running in test mode does not accept a message from the normal queue and accepts a message from the queue dedicated to testing. In FIG. 9B, the developer puts a job in the queue dedicated to testing and checks whether or not the worker 1132x operates normally by requesting the worker 1132x to process the job.

In FIG. 9C, after receiving the result of processing the job by the worker 1132x, the developer transitions the worker 1132x from test mode into normal mode if there is no problem. Regarding the determination of transitioning from test mode into normal mode, as described later, it is possible to determine by testing whether or not a specific file exists for example. By deleting the specific file, the worker 1132x transitions from test mode into normal mode.

It should be noted that the worker 1132 that transitions into normal mode once does not transitions from normal mode into test mode. As a result, while the worker 1132x is checked, the worker 1132 is not affected and may continue operation in normal mode. In FIG. 9C, subsequent to the worker 1132x, the worker 1132y is allocated and started in test mode.

Figure 10:
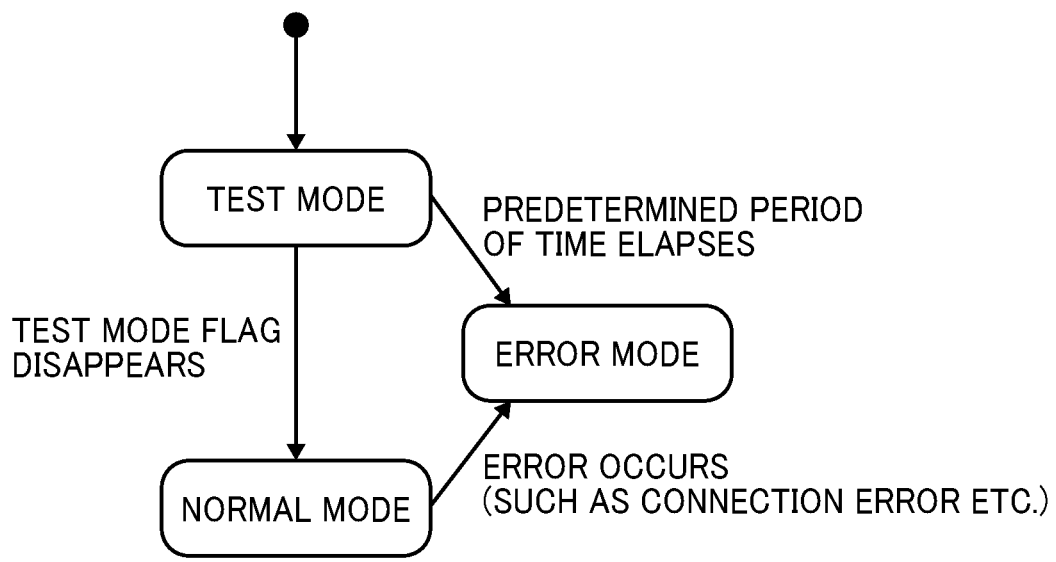
FIG. 10 is a diagram illustrating a state transition of the worker according to an embodiment of the present invention.

FIG. 10 is a diagram illustrating a state transition of the worker in this embodiment. Statuses of the worker 1132 are test mode, normal mode, and error mode. After being started, the worker 1132 transitions to test mode. As described before, the worker 1132 running in test mode accepts a message from the queue dedicated to testing only.

The worker 1132 running in test mode monitors a test mode flag and transitions from test mode into normal mode if the test mode flag disappears. Whether or not an empty file whose name is specific exists is referred to as an example of the test mode flag. If the file of the test mode flag exists, the worker 1132 operates in test mode, and if the file of the test mode flag does not exists, the worker 1132 operates in normal mode.

In case of operating in test mode, if a predetermined period of time elapses while the worker 1132 operates in test mode, it is determined that testing failed, and the worker 1132 transitions into error mode. In case of operating in normal mode, if error such as connection error occurs, the worker 1132 transitions into error mode. The worker 1132 running in error mode does not accept a new job.

Figure 11:
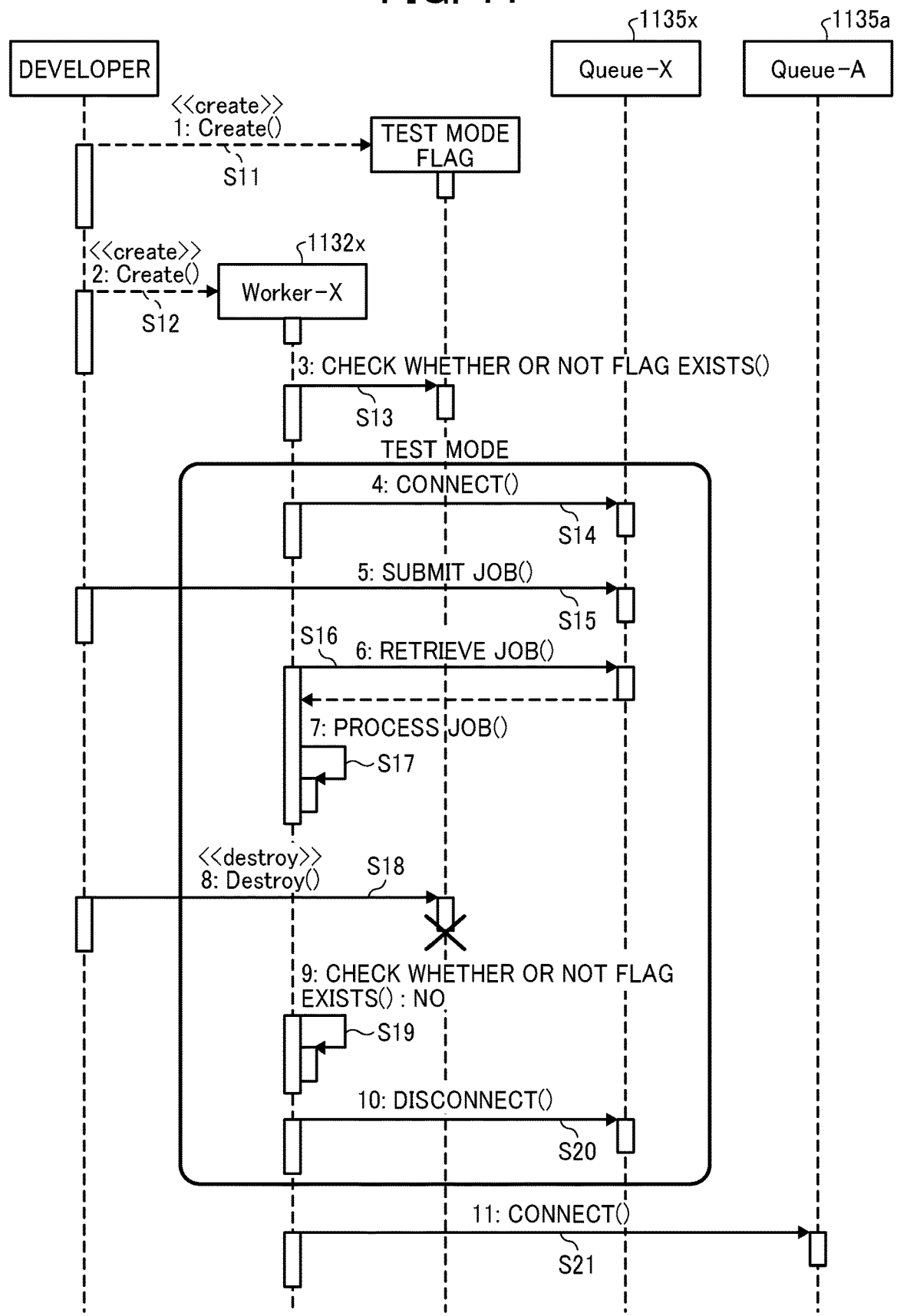
FIG. 11 is a sequence chart illustrating operations of examining and executing the worker according to an embodiment of the present invention.

FIG. 11 is a sequence chart illustrating operations of examining and executing the worker in this embodiment. By going through steps illustrated in FIG. 11, in the service providing system 1100 in this embodiment checks the worker 1132x without affecting the worker 1132 after transitioning into normal mode and starts the worker 1132x.

In S11, the developer creates a file whose name is specific as the test mode flag. In S12, the developer allocates the worker 1132x to be released in the worker server and starts the worker 1132x. The worker 1132x is started in test mode.

In S13, the worker 1132x determines whether or not the file of the test mode flag exists. If the file of the test mode flag exists, the worker 1132x proceeds to step S14 and requests the message queue 1131 to connect to the queue dedicated to testing 1135x. The message queue 1131 connects the worker 1132x to the queue dedicated to testing 1135x. After performing the operation in S14, the message queue 1131 starts requesting the worker 1132x to process job of the message put into the queue dedicated to testing 1135x.

After the worker 1132x is started, in S15, the developer puts a job for testing into the queue dedicated to testing 1135x. Here, the content of the job for testing is the same as the normal job. As described above, by making the content of the job for testing the same as the normal job, the worker 1132x may perform an operation without caring about whether the job is for normal or for testing, and it is not required to add a new operation to the worker 1132x. The difference between the worker 1132x that processes the job for testing and the worker 1132x that processes the normal job is whether the connected queue is the queue dedicated to testing 1135x or the connected queue is the normal queue 1135a.

In S16, the worker 1132x acquires the job for testing put into the queue dedicated to testing 1135x. In S17, the worker 1132x processes the acquired job.

After receiving the result of processing the job for testing, the developer deletes the file of test mode flag in S18 if there is no problem. In S19, the worker 1132x detects that the file of test mode flag disappears and disconnects the queue dedicated to testing 1135x in S20. In S21, the worker 1132x requests the message queue 1131 to connect to the normal queue 1135a. After performing the operation in S21, the message queue 1131 starts requesting the worker 1132x to process the job put into the normal queue 1135a.

Figure 12:
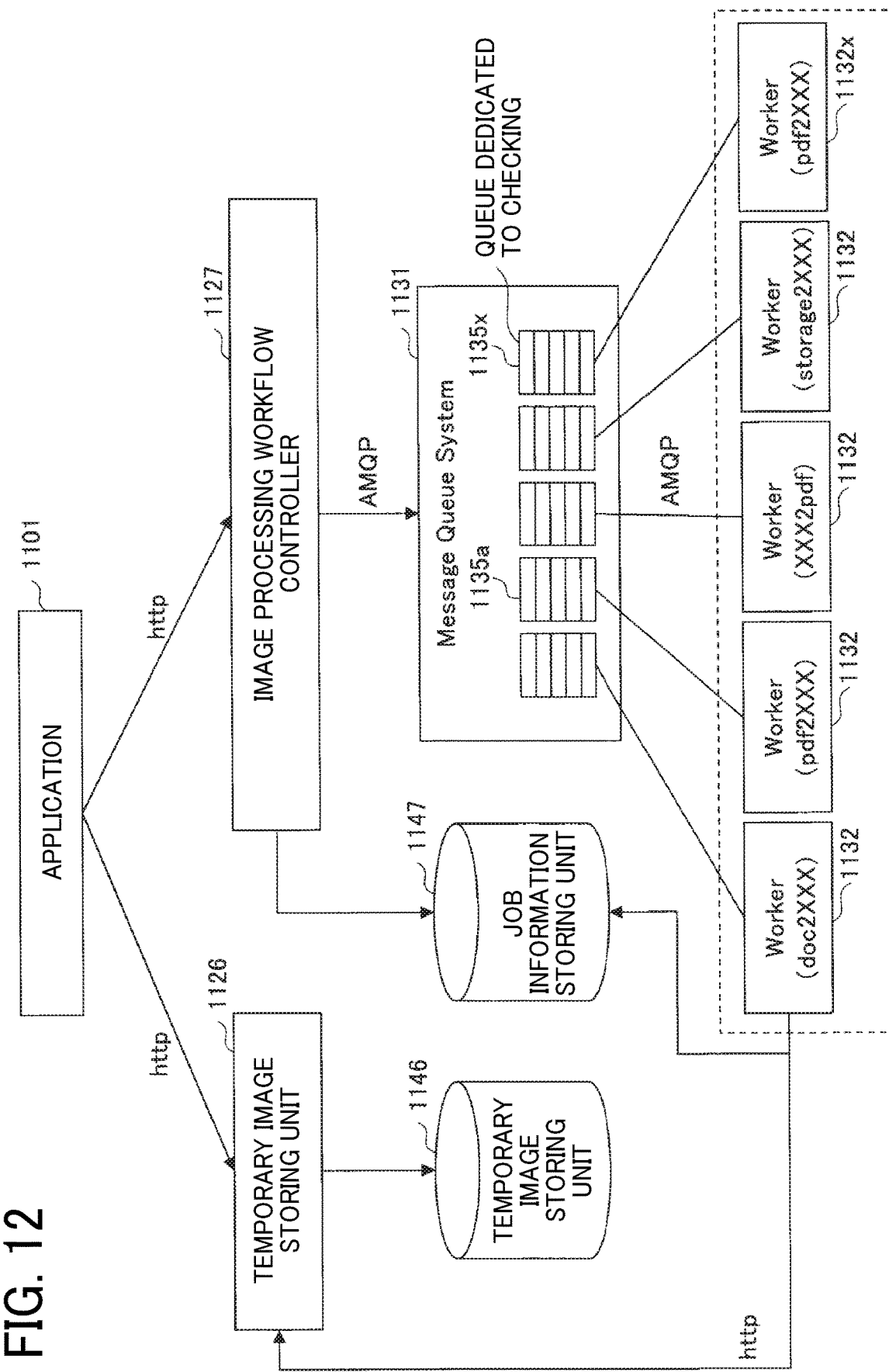
FIG. 12 is a diagram illustrating an asynchronous operation performed by the service providing system as an embodiment of the present invention.

As described below, the worker to be updated in an asynchronous operation performed by the service providing system 1100 in FIG. 4 is released without stopping other workers. FIG. 12 is a diagram illustrating an asynchronous operation performed by the service providing system in this embodiment.

In FIG. 12, among functional blocks in the service providing system 1100 illustrated in FIG. 4, the application 1101, temporary image storing unit 1126, image processing workflow controller 1127, message queue 1131, and worker 1132 are illustrated.

The application 1101 requests the temporary image storing unit 1126 to store a scanned image uploaded by the image forming apparatus 1013 as a file. After storing the file of the scanned image in the temporary image storing unit 1146, the temporary image storing unit 1126 returns a URI indicating where the file is stored to the application 1101. The application 1101 requests the image processing workflow controller 1127 to register the job information. The image processing workflow controller 1127 registers the job information in the job information storing unit 1147. The job information storing unit 1147 issues a job ID of the job whose job information is registered and returns the issued job ID to the image processing workflow controller 1127.

The image processing workflow controller 1127 analyzes a type (function) of the operation from a type included in the job information. The image processing workflow controller 1127 puts a message of a request regarding the job in a queue of the message queue 1131 corresponding to the type of the operation. The image processing workflow controller 1127 analyzes the type of the required operation and controls performing the asynchronous operation.

The message queue 1131 includes queues corresponding to multiple types of processing. In FIG. 12, the worker 1132 and the queue handled by the worker 1132 is connected using a line. In addition, the message queue 1131 in FIG. 12 includes a normal queue 1135*a* and a queue dedicated to testing 1135*x*.

For example, in FIG. 12, the worker 1132*x* whose processing type is "pdf2xxx" is allocated as the worker 1132*x* to be released. The worker 1132 whose processing types are "doc2xxx", "pdf2xxx", "xxx2pdf", and "storage2xxx" continues performing operation in normal mode.

Since the worker 1132*x* is starting up in test mode, the worker 1132*x* is connected to not the normal queue 1135*a* whose processing type is "pdf2xxx" but the queue dedicated to testing 1135*x*. As a result, the worker 1132*x* running in test mode does not accept a message from the normal queue 1135*a* and accepts a message from the queue dedicated to testing 1135*x*.

The worker 1132*x* performs processing job of the message put into the queue dedicated to testing 1135*x*. While the worker 1132*x* is running in test mode, the worker 1132 whose processing type is "pdf2xxx" continues processing job of the message put into the normal queue 1135*a*. As a result, in the service providing system 1100 in FIG. 4, while the worker 1132*x* to be updated is running in test mode, for example, it is not required to stop performing service whose processing type is "pdf2xxx".

For example, after receiving the result of processing the job for testing, the developer deletes the file of test mode flag if there is no problem. After detecting that the tile of test mode flag is deleted, the worker 1132*x* disconnects the queue dedicated to testing 1135*x*. The worker 1132*x* requests the message queue 1131 to connect to the normal queue 1135*a* whose processing type is "pdf2xxx". Subsequently; the message queue 1131 starts requesting the worker 1132*x* to process the job put into the normal queue 1135*a* whose processing type is "pdf2xxx".

For example, the worker 1132*x* detects a message of the request regarding the job put into the normal queue 1135*a*. The worker 1132*x* acquires a message registered in the queue. The worker 1132*x* acquires job information corresponding to the job ID included in the acquired message from the job information storing unit 1147. The worker 1132*x* reads the URI indicating where the file of the scanned image is stored in the temporary image storing unit 1146 from the acquired job information.

Subsequently, by designating the URI indicating where the file of the scanned image is stored in the temporary image storing unit 1146, the worker 1132*x* acquires the file of the scanned image from the temporary image storing unit 1146. The worker 1132*x* performs processing the job on the acquired file of the scanned image. The worker 1132*x* reports to the job information storing unit 1147 that processing the job is finished to request the job information storing unit 1147 to update the status of the finished job.

As described above, in the information processing system 1000 in this embodiment, in case of adding or updating the worker 1132*x*, it is required not to affect service being operated. Therefore, in the information processing system 1000 in this embodiment, after deploying (allocating) the worker 1132*x* to be added or updated, it is required to check the worker 1132*x* and start operating the worker 1132*x* if the testing succeeded.

Consequently, in the information processing system 1000 in this embodiment, after starting the worker 1132*x*, first, the worker 1132*x* runs in test mode. Subsequently, if the testing succeeded, test mode is released and the worker 1132*x* transitions into normal mode. Since the worker 1132*x* running in test mode does not accept a message from the normal queue and accepts a message from the queue dedicated to testing, it is possible to add or update the worker 1132*x* without stopping service.

The normal queue 1135*a* is an example of a first memory. The queue dedicated to testing 1135*x* is an example of a second memory. The worker 1132*x* is an example of a data processor.

The embodiments described above provide the information processing system that may update the data processing program without stopping the service provided by the data processing program.

The present invention also encompasses a non-transitory recording medium storing a program that executes an updating method, performed by an information processing system. The updating method, performed by the information processing system, includes the steps of storing in a first memory information on a request to perform data processing associated with a type of the data processing, storing in a second memory information on a request to perform data processing for testing, starting up in a test mode to operate in the test mode, the test mode being a mode that performs acquiring the information on the request to perform the data processing for testing being stored in the second memory, and performing the data processing for testing, and transitioning from the test mode to a normal mode in accordance with a user request, to operate in the normal mode, the normal mode that performs acquiring the information on the request to perform the data processing being stored in the first memory, and performs the data processing.

It should be noted that the case that the computer apparatus reads and executes the program code is just one example to implement the functional units in the embodiments described above. In addition, in accordance with instructions by the program code, an operating system (OS) running on the computer apparatus may perform a part of the operations or all operations. Furthermore, the functional units described in the above embodiments may obviously be implemented by performing those operations.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing system, comprising:
   an image processing workflow controller configured to control workflow regarding image processing;
   a message queue including
      a first memory to store information on a request for performing normal data processing associated with a type of the data processing;
      a second memory dedicated to storing information on a request for performing data processing for updating of a program and testing the updated program; and
   a plurality of circuitry to perform data processing and asynchronous updating according to the type of the data processing,
   wherein the plurality of circuitry includes:
      a first circuitry configured to operate in a normal mode; and
      a second circuitry configured to operate in the normal mode and a test mode, wherein the second circuitry is configured to:
      end operating in the normal mode and start up in the test mode to operate in the test mode by receiving messages from only the second memory while the first circuitry operates in the normal mode; and
      transition from the test mode to the normal mode according to a user request to operate in the normal mode,
      the normal mode being a mode in which the circuitry acquires the information on the request for performing the data processing being stored in the first memory and performs the data processing;
      the test mode being a mode in which the circuitry acquires the information on the request for performing the data processing for updating and testing being stored in the second memory and performs the data processing for the program updating and testing.

2. The information processing system according to claim 1, wherein the second circuitry transitions from the test mode to an error mode when a predetermined period of time elapses while the circuitry operates in the test mode.

3. The information processing system according to claim 1, wherein the second circuitry:
   monitors, while the circuitry operates in the test mode, a flag indicating whether the test mode is maintained or the circuitry transitions from the test mode to the normal mode; and
   transitions from the test mode to the normal mode when the flag indicates that the circuitry transitions from the test mode to the normal mode.

4. The information processing system according to claim 1, wherein the second circuitry:
   monitors, while the circuitry operates in the test mode, a flag indicating whether the test mode is maintained or the circuitry transitions from the test mode to the normal mode depending on whether a predetermined file exists or not; and
   transitions from the test mode to the normal mode when the predetermined file does not exist.

5. A method of updating performed by an information processing system implementing a image processing workflow control, including one or more information processing apparatuses, the method comprising:
   storing in a first memory, as part of the processing workflow message queue, information on a request to perform normal data processing associated with a type of the data processing;
   storing in a second memory, as part of the processing workflow message queue, information on a request from a developer to perform data processing for updating of a program and testing of the updated program;
   providing a plurality of circuitry including a first circuitry configured to operate in a normal mode, and a second circuitry configured to operate in the normal mode and a test mode;
   ending operation of second circuitry in a normal mode and starting up the second circuitry in a test mode by receiving messages from only the second memory, to operate in the test mode while first circuitry operates in the normal mode,
   the test mode being a mode that performs acquiring the information on the request to perform the data processing for updating and testing the program stored in the second memory; and
   transitioning the second circuitry from the test mode to the normal mode in accordance with a developer request, to operate in the normal mode,
   the normal mode that performs acquiring the information on the request to perform the data processing being stored in the first memory.

* * * * *